(No Model.)

S. CLARKE.
INFANT'S FOOD WARMER OR NIGHT LIGHT APPARATUS.

No. 334,747. Patented Jan. 26, 1886.

United States Patent Office.

SAMUEL CLARKE, OF CHILD'S HILL WORKS, COUNTY OF MIDDLESEX, ENGLAND.

INFANT'S FOOD-WARMER OR NIGHT-LIGHT APPARATUS.

SPECIFICATION forming part of Letters Patent No. 334,747, dated January 26, 1886.

Application filed April 9, 1885. Serial No. 161,669. (No model.)

*To all whom it may concern:*

Be it known that I, SAMUEL CLARKE, a subject of the Queen of Great Britain, residing at the Child's Hill Works, in the county of Midddlesex, England, candle and night-light manufacturer, have invented an Infant's Food-Warmer or Night-Light Apparatus, of which the following is a specification.

This invention relates to an infant's food-warmer or night-light apparatus.

In accordance with my invention, I provide a stand, preferably constructed of tinned iron, and consisting of a base-plate, above which there is supported a hot-air chamber. This is cylindrical in form, and for the entrance of the hot-air it has a central hole in the bottom, and there are also apertures in the sides, by which the hot air passes out. The heat is derived from a night-light or small lamp provided with a glass or chimney. Preferably a pyramid night-light is employed. This is placed in a metallic saucer and covered by a dome-like glass. Perforations round the circumference of the saucer allow air to enter for combustion, and the heated air passes out at the top of the glass, and thence rises directly and enters at the bottom of the air-chamber. The heated-air chamber receives within it a metal pot cylindrical in form, provided with a handle and intended to contain a small quantity of water. A projection is formed around the side of this pot or vessel about midway between the top and the bottom, and the projection rests upon the upper edge of the air-vessel. In this way the pot or vessel is supported in its place, and the heat from the night-light or lamp circulates around its bottom or sides.

The food to be warmed is to be contained within an earthenware vessel, which enters partly within the pot in which the water is contained. The upper part of the earthenware vessel is enlarged to form a rim, and this rests securely on the top of the pot. The food-vessel is provided with a handle and spout convenient for pouring, and a lid or cover is attached to it.

In order that my said invention may be most fully understood and readily carried into effect, I will proceed to describe the drawings hereunto annexed.

Figure 2:
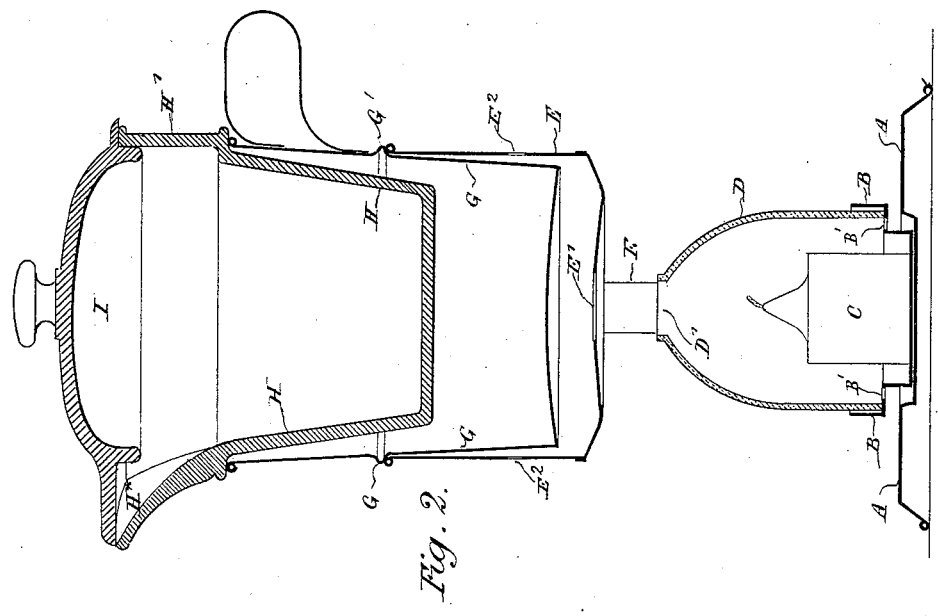
Figure 1:
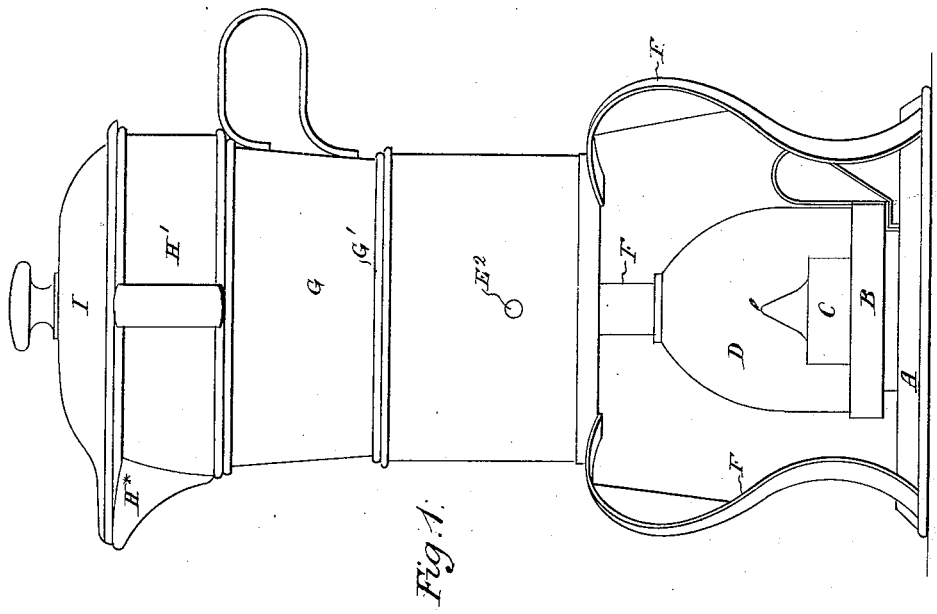

In the drawings, Figure 1 is a side elevation of my food-warmer. Fig. 2 is a vertical section of the same.

A supporting-stand, of which A is the base-plate, has a cavity in the center of this plate to receive the metallic saucer B, in which is placed the pyramid night-light C. D is the dome-glass with which this is covered. Air enters to the glass by the perforations B', and, when heated, passes out by the opening D' at the top of the glass.

E is the heated-air vessel, supported from the base by the legs F F of the supporting-stand.

E' is the opening in the bottom of the heated-air vessel at which the air rising from the glass at D' enters.

$E^2$ are holes in the sides of the heated-air vessel, by which the air, having parted with a portion of its heat, escapes.

G is a pot or vessel for containing water. It drops down into the heated-air vessel E, being supported on the upper edge of this vessel by the enlargement or rim G'.

H is an earthenware vessel in which the food to be warmed or kept warm is placed. The lower part of this vessel enters within the pot G, and it is supported by its enlarged upper part, H', resting upon the upper edge of the pot.

H* is the spout, and I is the cover, of the earthenware food-vessel. This cover also is of earthenware.

I claim as my invention—

The combination of the food-vessel, the hot-water vessel, into which the bottom of the food-vessel enters, the hot-air vessel, having a central bottom opening and side openings, and into which the hot-water vessel enters from above, the supporting-stand, upon the legs of which the hot-air vessel rests, the saucer for the night-light, resting in a cavity of the base-plate of the supporting-stand, and the dome-glass, supported upon the saucer beneath the hot-air vessel, and from which the heat passes into the hot-air vessel, substantially as and for the purpose set forth.

SAMUEL CLARKE.

Witnesses:
JNO. DEAN,
ARTHUR RICHARD SKERTEN,
*Both of 17 Gracechurch Street, London.*